UNITED STATES PATENT OFFICE.

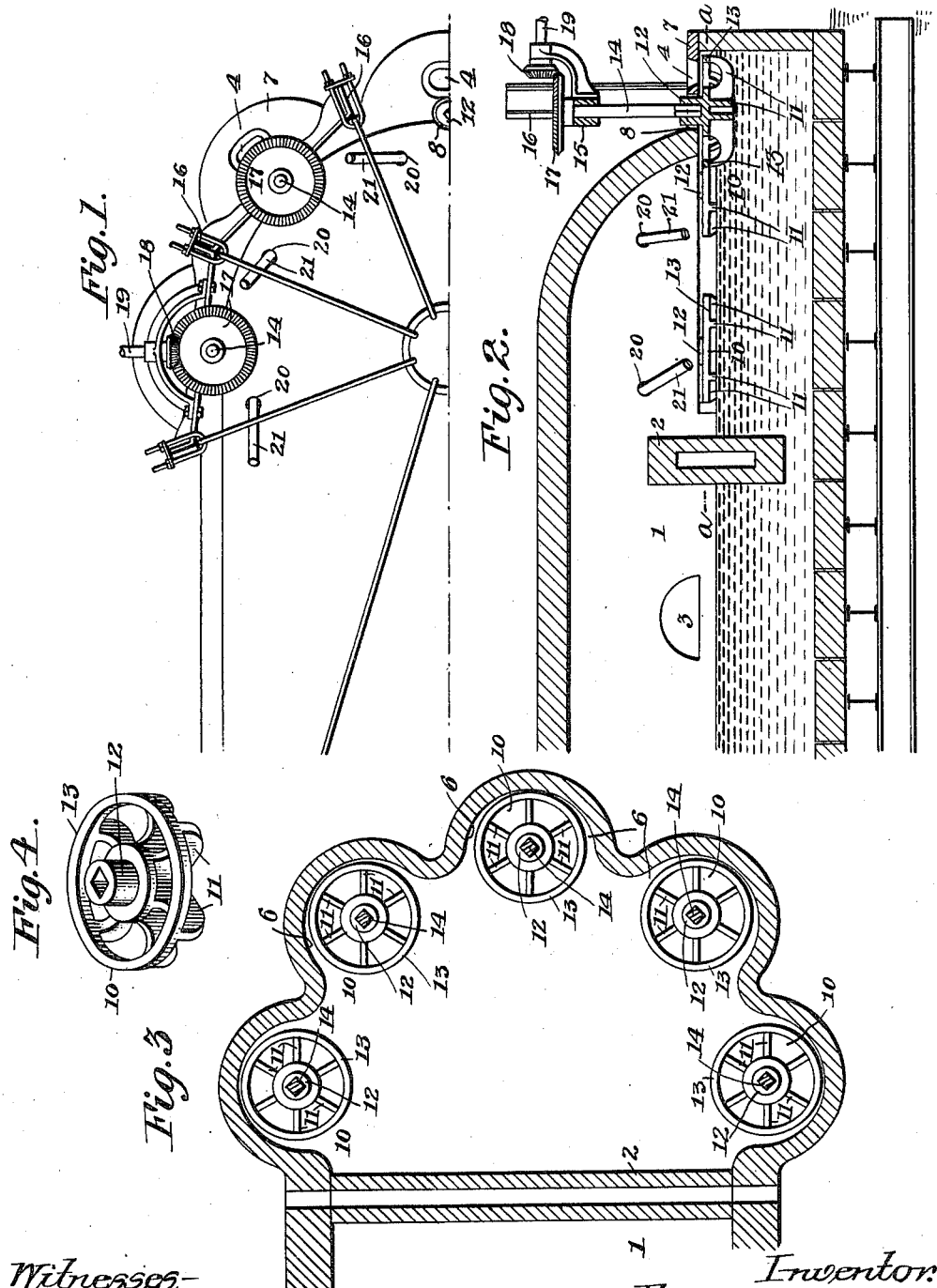

FRANK H. GIBSON, OF BRIDGETON, NEW JERSEY.

GLASS-FURNACE.

1,032,598.

Specification of Letters Patent.  Patented July 16, 1912.

Application filed May 9, 1908. Serial No. 431,786.

*To all whom it may concern:*

Be it known that I, FRANK H. GIBSON, a citizen of the United States, and a resident of Bridgeton, Cumberland county, New Jersey, have invented certain Improvements in Glass-Furnaces, of which the following is a specification.

My invention relates to apparatus employed for maintaining glass in molten form and the keeping of it at the proper consistency for working, and it consists of an improved form of such apparatus particularly intended for use in connection with glass blowing machines and presses where mechanical gathering is possible.

The object of my invention is to provide a structure wherein a sufficient quantity of molten glass at a proper consistency and readily accessible for gathering by such machines may be maintained at all times; such structure being capable of use in connection with machines designed for drawing the glass into molds or forms by suction, or by dipping, in any suitable manner.

A further object of my invention is to provide means for carrying away the chilled glass on the surface of the molten body caused by the dipping or gathering operation so that it can be again brought to the proper molten condition, and to constantly supply fresh portions of molten glass at the gathering point or points; thereby permitting maximum speed in the gathering operations.

My invention is fully shown in the accompanying drawings, in which:

Figure 1, is a plan view of half of a glass melting furnace made in accordance with my invention; Fig. 2, is a sectional elevation of the same; Fig. 3, is a sectional plan view, taken on the line *a—a*, Fig. 2, and Fig. 4, is a view illustrating a detail of my invention.

The essential feature of my invention consists of means for keeping a constant supply of completely molten glass at the gathering points, and the furnace I have shown herewith is provided with five such gathering points.

In the drawings herewith, 1 represents a glass furnace of substantially the usual type, having a bridge wall, or float 2, and heated in the customary manner; 3 indicating gas ports in the side walls for the entrance of gas and air for combustion within the furnace. The top of the furnace is substantially covered, except for gathering openings 4 at the front, while an opening (not shown) may be provided at the rear of the furnace for the introduction of the materials forming the ingredients of the glass.

The working end of the furnace in the present instance is semi-circular and is arched over in the usual manner, and a series of small semi-circular chambers 6 are built in said semi-circular wall forming pools which open into the tank proper. Over these semi-circular chambers I place covers 7 in substantially close proximity with the glass. These covers are made of fire clay or other refractory material and can be removed readily if necessary. In these covers, near the outer edge, I provide the openings 4 for gathering the glass. I also provide openings 8 in these covers on the inner edge in line with the base of the arched top of the furnace, for a purpose to be described hereinafter.

For the purpose of effecting the maintenance of fresh supplies of fully and completely molten glass at the several gathering pools at all times, I provide rotating stirrers 10 to agitate the mass of glass within the furnace, and these stirrers may be rotated continuously or intermittently as occasion requires. These stirrers are circular in form as shown, and are provided with vanes or blades 11 extending from a central hub 12 and connected at their outer ends by a ring 13. Between the outer ring and the hub, I cut away the upper part of the vanes or blades to allow sufficient depth of glass for gathering purposes; the stirrers being mounted so that the depressions so made come directly under the gathering openings in the covers 7. The central hubs of the stirring devices extend through the covers 7 in close proximity with the arched top of the furnace, and such projecting portions are provided with openings preferably angular and of considerable depth in which I may loosely fit vertical shafts 14 for driving said stirring devices. These openings are of sufficient depth to allow the stirring devices to float on the surface of the glass under variations in the surface level of the same. The chambers 6 communicate directly with the main body of molten glass, and hence there is a constant supply of the same brought to the gathering points by the rotation of the stirrers, preventing the accumulation of chilled glass adjacent said gathering points.

The stirrers 10 are clearly shown in the perspective view, Fig. 4. They are made of any suitable form of refractory material and as indicated, comprise simply a hub carrying a series of vanes or blades connected by an outer ring; such vanes being cut away at the top between the hub and ring. The stirrers are suitably disposed in the furnace in the manner indicated so as to be capable of rotation on the surface of the glass beneath the gathering points. The shafts 14 are supported in suitable bearings 15 carried by buck-stays 16 and carry gear wheels 17. Motion is imparted to said gear wheels from pinions 18 carried by shafts 19, such shafts receiving motion from any suitable source or from a glass working machine that may be used in connection with the apparatus forming the subject of my invention. If necessary, the roof of the furnace may be provided with apertures 20 for the passage of gas burners 21 disposed so that their flames are adjacent the rim of the stirrers, for the purpose of melting any glass that might cool on the same.

I claim:

1. The combination of a glass furnace having a body portion with a contracted extension forming a gathering pool, said gathering pool having a body of molten glass in direct connection with the main mass of molten glass, a removable top or cover section having a gathering aperture over said pool, means within the contracted extension of the furnace for stirring the glass to maintain a freshly molten mass of the same in said gathering pool, and means for melting any chilled portions of the mass of glass produced by the gathering operation and restoring them to the uniform consistency of the main body of molten glass.

2. The combination of a glass furnace having a body portion with a contracted extension forming a gathering pool, a top or cover having a gathering aperture disposed over said pool, a rotatable bladed stirrer arranged within said contracted extension of the furnace and serving to bring bodies of freshly molten glass to the same, means for melting chilled portions of the mass of glass produced by the gathering operation and restoring them to the uniform consistency of the main body of molten glass, and means for rotating said stirrer, the latter projecting through the top or cover and the connection between the rotating means and stirrer being such as to permit the stirrer to rise and fall with the changing level of the molten glass.

3. The combination of a glass furnace having a body portion with a plurality of contracted extensions forming gathering pools, a top or cover having a plurality of gathering apertures disposed over said pools, rotatable bladed stirrers arranged within said contracted extensions and serving to bring bodies of freshly molten glass to the pools within the same, means for melting chilled portions of the mass of glass produced by the several gathering operations and restoring them to the uniform consistency of the main body of molten glass, and means for independently rotating said stirrers.

4. The combination with a furnace having a body of molten glass and a cover with a gathering aperture overlying said molten glass, of a rotatable stirrer supported by the molten glass, the gathering aperture in said cover being disposed at one side of the axis of the stirrer, and blades carried by said stirrer, said blades being hollowed on the upper sides and disposed in position to rotate beneath the aperture whereby a body of glass with an uninterrupted surface may be maintained in proper molten condition at such gathering point.

5. The combination with a furnace having a body of molten glass and a cover with a gathering aperture overlying said molten glass, of a rotatable stirrer supported by the molten glass, the gathering aperture in said cover being disposed at one side of the axis of the stirrer, blades carried by said stirrer, and circular rings carried thereby by which said blades are spaced and connected together, said blades being hollowed on the upper sides and disposed in position to rotate beneath the aperture whereby a body of glass with an uninterrupted surface may be maintained in proper molten condition at such gathering point.

6. The combination with a furnace having a body of molten glass, of a rotatable stirrer disposed in the body of molten glass, and blades carried by said stirrer, said blades being hollowed on their upper sides with such hollowed portion immersed in the glass whereby a body of glass with an uninterrupted surface may be maintained in proper molten condition for gathering.

In testimony whereof, I have signed my name to this specification, in the presence of two subscribing witnesses.

FRANK H. GIBSON.

Witnesses:
 FRANK S. MCKEE, Jr.,
 GORDON MCNEIL.